US012548405B2

(12) United States Patent
Halliburton

(10) Patent No.: US 12,548,405 B2
(45) Date of Patent: Feb. 10, 2026

(54) SPINNING SKILLED-BASED GAME THAT DISPENSES PRIZES

(71) Applicant: Ronald Halliburton, Loxahatchee, FL (US)

(72) Inventor: Ronald Halliburton, Loxahatchee, FL (US)

( * ) Notice: Subject to any disclaimer, the term of this patent is extended or adjusted under 35 U.S.C. 154(b) by 279 days.

(21) Appl. No.: 18/023,806

(22) PCT Filed: Sep. 27, 2021

(86) PCT No.: PCT/US2021/052235

§ 371 (c)(1),
(2) Date: Feb. 28, 2023

(87) PCT Pub. No.: WO2022/067200

PCT Pub. Date: Mar. 31, 2022

(65) Prior Publication Data

US 2024/0013621 A1 Jan. 11, 2024

Related U.S. Application Data

(60) Provisional application No. 63/083,096, filed on Sep. 25, 2020.

(51) Int. Cl.
*G07F 17/32* (2006.01)
*G07F 17/34* (2006.01)

(52) U.S. Cl.
CPC ...... *G07F 17/3253* (2013.01); *G07F 17/3216* (2013.01); *G07F 17/34* (2013.01)

(58) Field of Classification Search
CPC ............... A63F 2250/144; A63F 5/045; G07F 17/3216; G07F 17/3253; G07F 17/34
See application file for complete search history.

(56) References Cited

U.S. PATENT DOCUMENTS 5,385,347 A * 1/1995 Halliburton ........... A63F 7/0058 273/138.2
7,766,329 B1 * 8/2010 Kelly .................. G07F 17/3216 273/118 A
2004/0094566 A1 * 5/2004 Renaud .............. B65D 83/0409 221/266
2006/0205475 A1 * 9/2006 Seelig ..................... G07F 17/32 463/16
2014/0274308 A1 * 9/2014 Guinn ................. G07F 17/3244 463/25

* cited by examiner

*Primary Examiner* — Justin L Myhr
(74) *Attorney, Agent, or Firm* — Andrew C. Aitken

(57) ABSTRACT

An amusement game is characterized by a wheel mounted for rotation in a vertical plane on a support member and a control arm to rotate the wheel which also has a plurality of prize containers at winning positions located at angular positions around the wheel wherein each of the containers has a radial passage that may align with a winning position and in alignment with a prize distribution area so when the wheel stops at a winning location, a prize retainer member is moved out of the passage allowing a prize in the container to drop from the wheel to the prize distribution area.

17 Claims, 21 Drawing Sheets

SPINNING SKILLED-BASED GAME THAT DISPENSES PRIZES

REFERENCE TO RELATED APPLICATIONS

The applicant claims the benefit of the filing date of U.S. Application No. 63/083,096 filed on Sep. 25, 2020.

FIELD OF THE INVENTION

The present invention is generally directed to the amusement game industry and more particularly towards street games designed for prize dispensing.

BACKGROUND OF THE INVENTION

There are a number of skill-based amusement games devices and gambling devices that use a rotating wheel having a plurality of target fields at angular locations that are spun and which eventually come to rest at a location that may correlate with a winning position. Many of these games, such as those referred to as carnival or casino wheels, require an operator to operate and supervise the game to prevent players from interfering with the spin of the wheel after play has initiated and to provide an award. There are a wide variety of other amusement games are also routinely designed to provide an award or prize immediately after a successful play. These include crane games, pushers, and other skill-based games which allows the distribution of prizes in response to game play.

There are also a wide variety of vending machine devices are designed to provide items in response to payment. An advantage of these games and vending devices is that a user can be granted immediate access to the reward or item without operator supervision and without having to contact a ticket counter or service provider. Consequently, such machines, sometimes referred to in the amusement industry as street games, may be placed at locations without supervision where the game owner periodically checks on the game, restocks prizes if necessary and collect any revenues earned.

OBJECTS AND SUMMARY OF THE INVENTION

It is an object to the invention to provide a skill-based amusement game, that in response to a winning play, will dispense an award or prize that requires only minimal supervision and management.

The present invention is generally directed to a game wherein the player can control the spin of an upright wheel to try stop the wheel stop at a designated winning location to win an item, such as a card, collectable card, or packet of cards, that is associated with the location. In embodiments the cards are gift cards and pre-loaded credit cards. The wheel, which, in embodiments, may contain up to 20 items, spins inside a secure case having a transparent front window that allows the user to see the progress of the spin after it is set in motion. The transparent window also prevents users from interference with the progress of the spin or tampering with the prizes displayed on the wheel. The spin of the wheel is activated by a lever that, upon activation of the game, can be engaged by the game player. The lever is connected to the wheel using a pawl which is controlled that by a motor to affect the engagement and disengagement of the wheel.

A first winning position sensor is provided that detects when the wheel and its associated prize has stopped directly at a location in vertical alignment with the winning position. When the wheel winning position and its associated prize container or cavity is in exact vertical alignment, a wheel position sensor detects a win, and activates a motor that releases a stop member, thereby dispensing the prize. In embodiments, the device also detects near misses by the player and provides an additional credit when a near miss is detected.

A further detector is provided that detects whether a prize is contained in the container of cavity provided at radial position in the wheel that has stopped at the winning position contains a prize. If the wheel stops at the winning position and a prize is contained in the associated cavity, in embodiments a motor is activated that moves a stop member located on a circumferential side to open or block a passage to allow for the downward release of the prize from the cavity and into an accessible area. In embodiments movement of the stop member is controlled by a solenoid. In alternative embodiments, the release of the prize uses an acme screw. When the stop member is moved from its blocking position that creates a boundary on the end of the contained distal form the wheel center, and opposite the end wall extended in the circumzenithal direction, a prize will fall into a dispensing area that is accessible by the player. In embodiments, the cavity can be sized to hold different prizes that are visible to the player, such a gift card, a preloaded credit card, collectable cards, including baseball, football, hockey, basketball, racing cards, game cards such as Pokeman Yu-Gi-Oh!, Magic: The Gathering, and VS System, or other prizes such as a smart phone, earbud speakers, watches and jewelry.

If the wheel comes to rest in directed alignment with the win pin associated with the cavity and no prize is in the cavity, such as a card is contained in the cavity, the player is provided with a predetermined number of additional turns to spin the wheel.

DETAILED DESCRIPTION

The present invention relates to an amusement game that is designed to be located at a street location or arcade and operates without significant upkeep and maintenance. The game owner only needs to periodically check and restock prize elements located in the prize wheel. In an embodiment the prize wheel is provided with gift cards that can be inspected by prospective players. The payouts or wins for the game are not computer controlled and players exercise skill by spinning the wheel at a rate that will cause an intended card to come to rest at a wining position.

Figure 1:
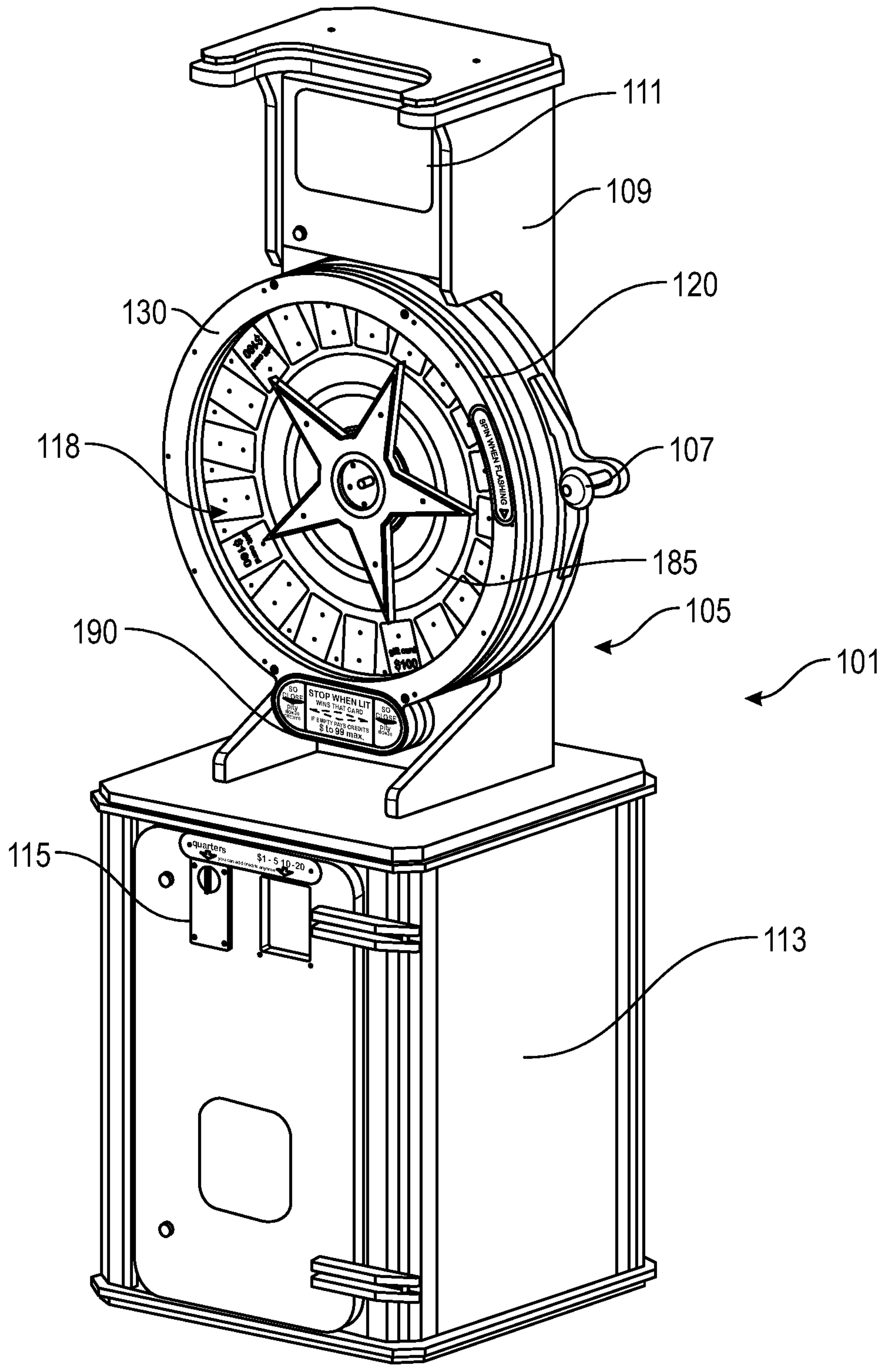
FIG. 1 is a front perspective view of an embodiment of the invention.

Now referring to FIG. 1, the amusement device depicted includes a base cabinet 113, a support member 109 extending from cabinet 113 on which an enclosed wheel assembly 105 is attached. Wheel assembly 105 includes lever arm end 107 that, when activated, allows a player to rotate a prize wheel 185 by imposing a selected force. Prize wheel 185 is enclosed in a case with a transparent front side 118, an annular side wall 120 and a rear side that is attached to support member 109. At the top of the support member 109 a display 11 is provided that includes dynamic lighting elements and a loudspeaker, both of which are controlled by a central controller. Cabinet 113 has payment device 115 that accept payments to allow the initiation of play which transmits signals to a central controller when sufficient credit is detected to provide a game credit.

Figure 2:
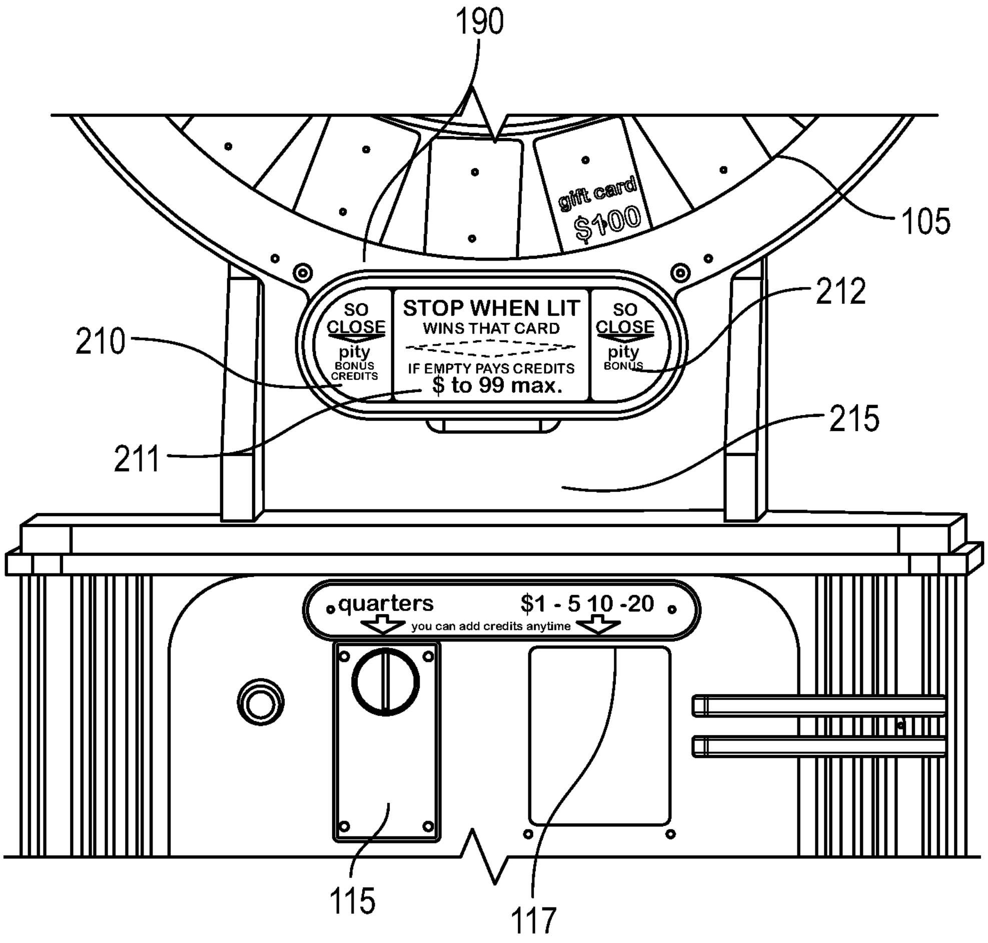
FIG. 2 is a fragmented front magnified view of the top of the cabinet, the wheel support member and the wheel.
Figure 3A:
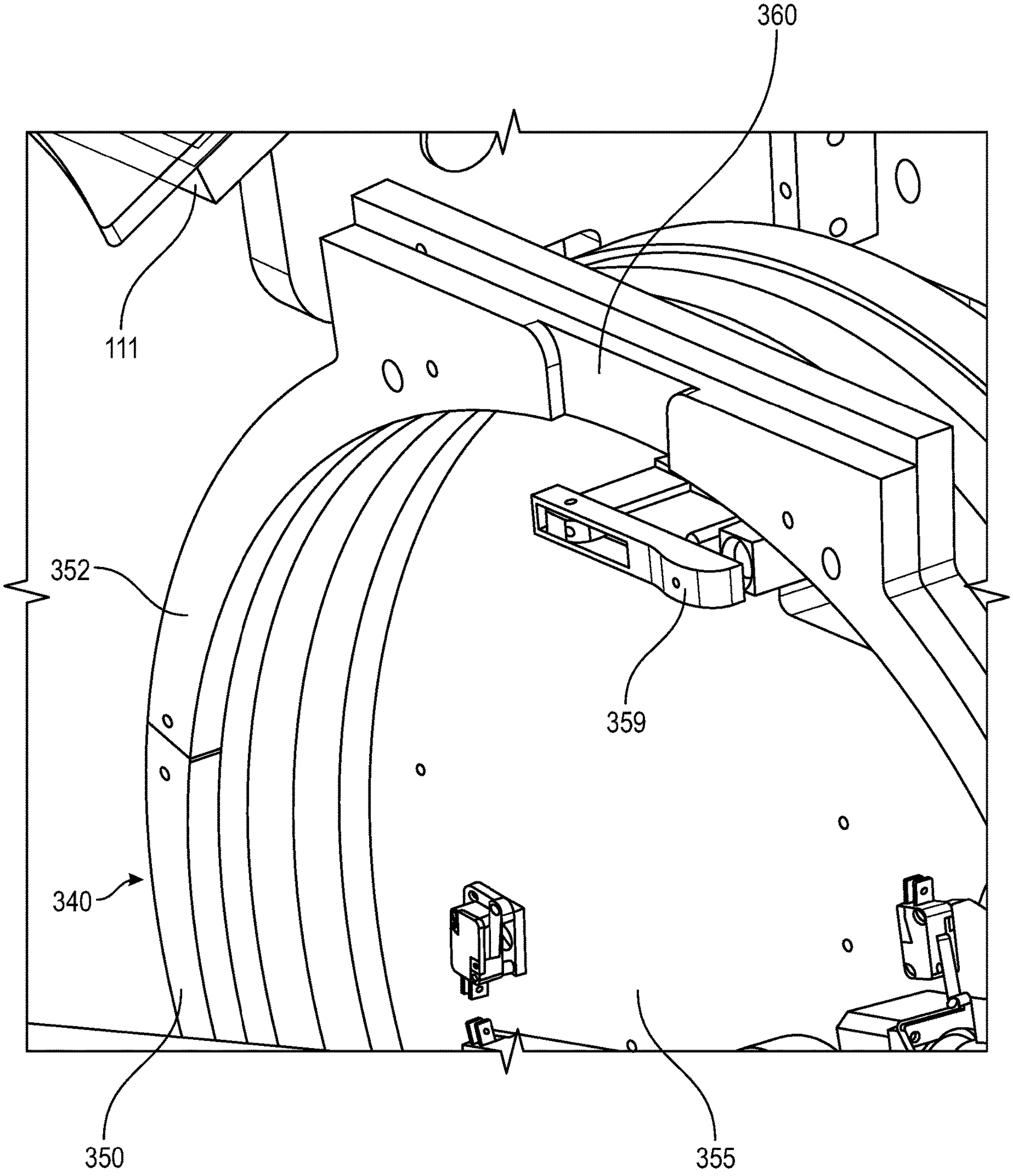
FIG. 3A is a front perspective view of the top section of the prize case depicting the brake and card load slot.

Referring now to FIG. 2, at the bottom of wheel assembly 105, display 220 is provided that includes a "near miss" designation portions 210 and 212 and a winning position 211. The "near miss" designation reflects a condition when the wheel comes to rest at a location that is not at the wining position but rather at a location adjacent or close to the winning position. Region 215 is the location on top of lower cabinet 113 that a card or other prize is dispensed to a player. FIG. 2 also shows coin acceptor 115 and currency acceptor device slot 117 that accepts payment in the form of currency and allows a player to activate and play the game. In embodiments, a magnetic card reader is provided that can accept payments from a card having a magnetic stripe. In yet further embodiments, other electronic payment systems and methods such as an RFID detector that is correlated with a player account is provided to accept payment. The device may also be configured to accept Apple® Pay and Samsung® Pay that that use magnetic secure transmission techniques that communicate with a payment acceptor device. The prize wheel 185 is encased by an outer front transparent window 118 that is held in place by a bezel-like ring member 130. As best seen in FIG. 3A, annular wall 340 of the prize wheel case is created by a plurality of arcuate segments such as segment 350 and 352 that are attached together and create an annular wall. Rear wall 355 of the prize wheel assembly case is a round flat planar member that is also attached to the annular wall. Rear wall 355 of the assembly is attached to support member 109. Mounted on the surface of rear wall 355 is a passive brake member 239 that includes an engagement surface made from leather or a material with similar properties that is positioned to contact with the rear surface 505 of prize wheel 185 and which causes the wheel to slow and eventually stop after the wheel is rotated. A central axel of the wheel is also attached to the rear wall that allows the wheel to spin inside the case. As best seen in FIG. 1 an opening in the sidewall 120 allows lever member 107 to extend through the annular wall of the case so it can be engaged by a player. In embodiments, the arm may further be provided with a bevel gear mechanism and an arm portion that extends towards the front of the cabinet to allow the arm to be pulled in a plane transverse to the wheel to rotate the wheel.

Figure 3B:
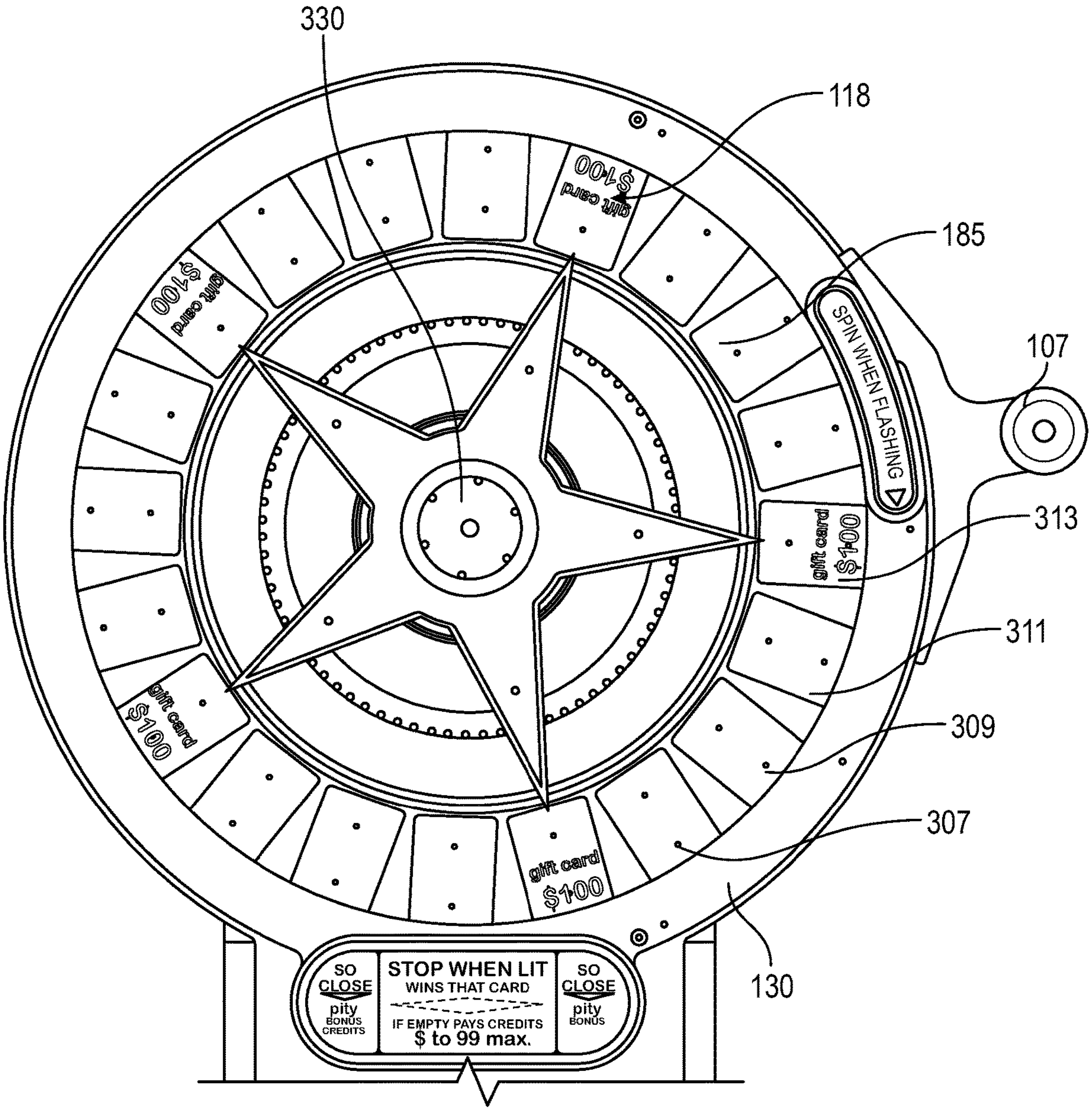
FIG. 3B is a fragmented front view of the wheel in elevation.

Referring now to FIG. 3B, prize wheel 185 has a plurality of prize containers of cavities, such as prize containers or cavities 307 309, 311 and 313, that are located in radial positions around the circumference of the prize wheel 185. These cavities have a radial opening and allow cards to be inserted and released through the opening in the annular wall 340. In the embodiment depicted in FIG. 3A, the cavities are generally rectangular and are sized and shaped to receive a conventional gift card. Prize wheel 185 rotates on central axel 303 that is mounted on rear wall 355.

Figure 5:
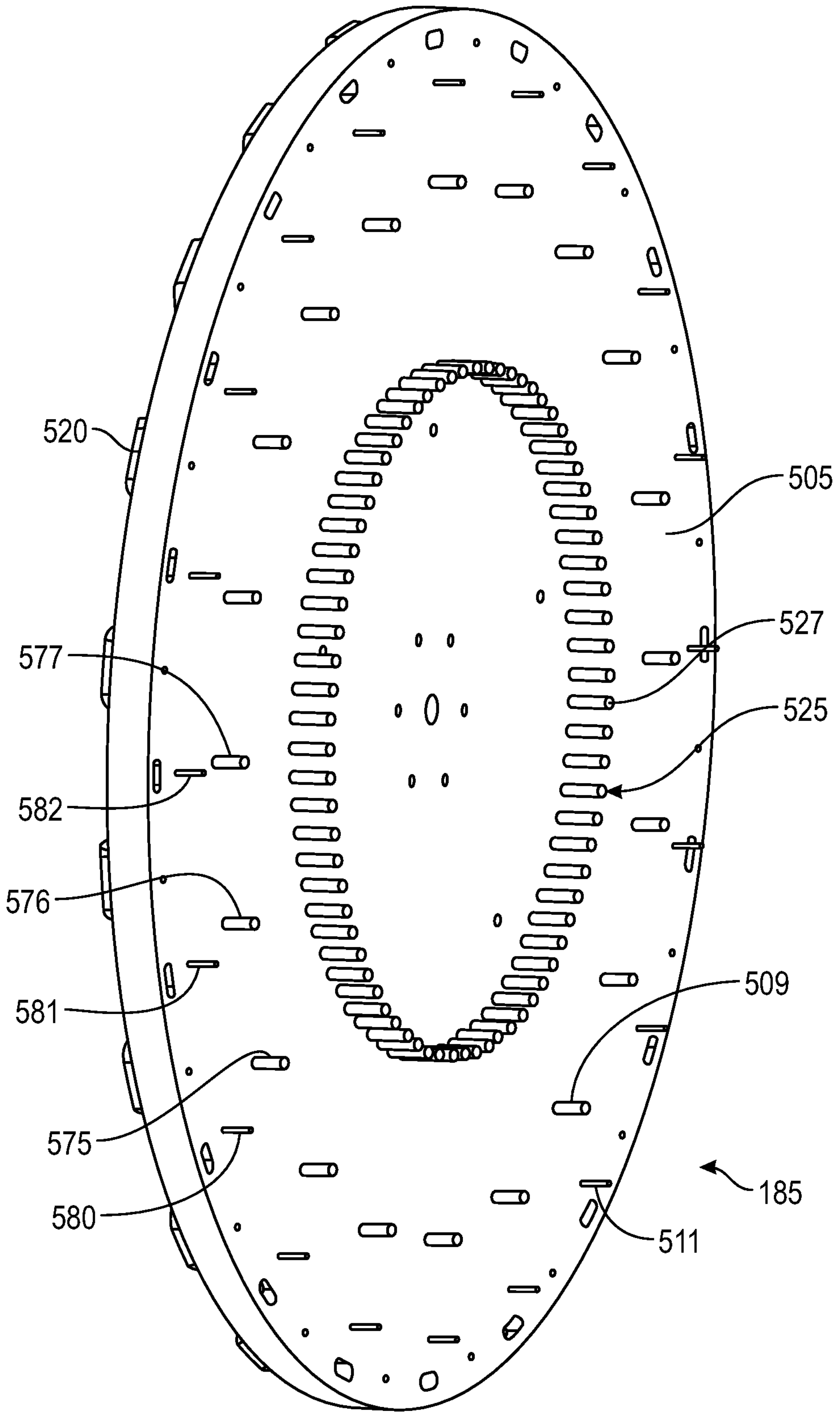
FIG. 5 is a perspective view of the wheel that includes annular scoring pins and pins for engagement by a pawl.

FIG. 5 shows the rear surface 505 of prize wheel 185 and, from rear surface 505, extend a series of rods that extend perpendicular to wheel rear surface 505 and arranged in annular configurations. An outermost ring is formed by a series of win position rods, such as 552, 581, 580 and 511 that are reflect winning positions. These rods have a relatively small diameter and are designed to be detected by winning position optical sensor. In radial alignment each win position rod, and closer to the center of the wheel, are "so close" position rods. The "near miss" position rods, such as rods 509, 575, 576 and 577 have a larger diameter than the winning position rods and are posited to be detected by so close position optical sensor. A third annular ring 525 made from a series of rods, such as rod 527, extends from the rear surface 505 of wheel 185 and the rods that make up the ring are positioned to be engaged by the prize wheel lever arm. Also seen on prize wheel are rectangular shaped openings of the prize cavities at the wheel periphery, such as opening 520.

Figure 4:
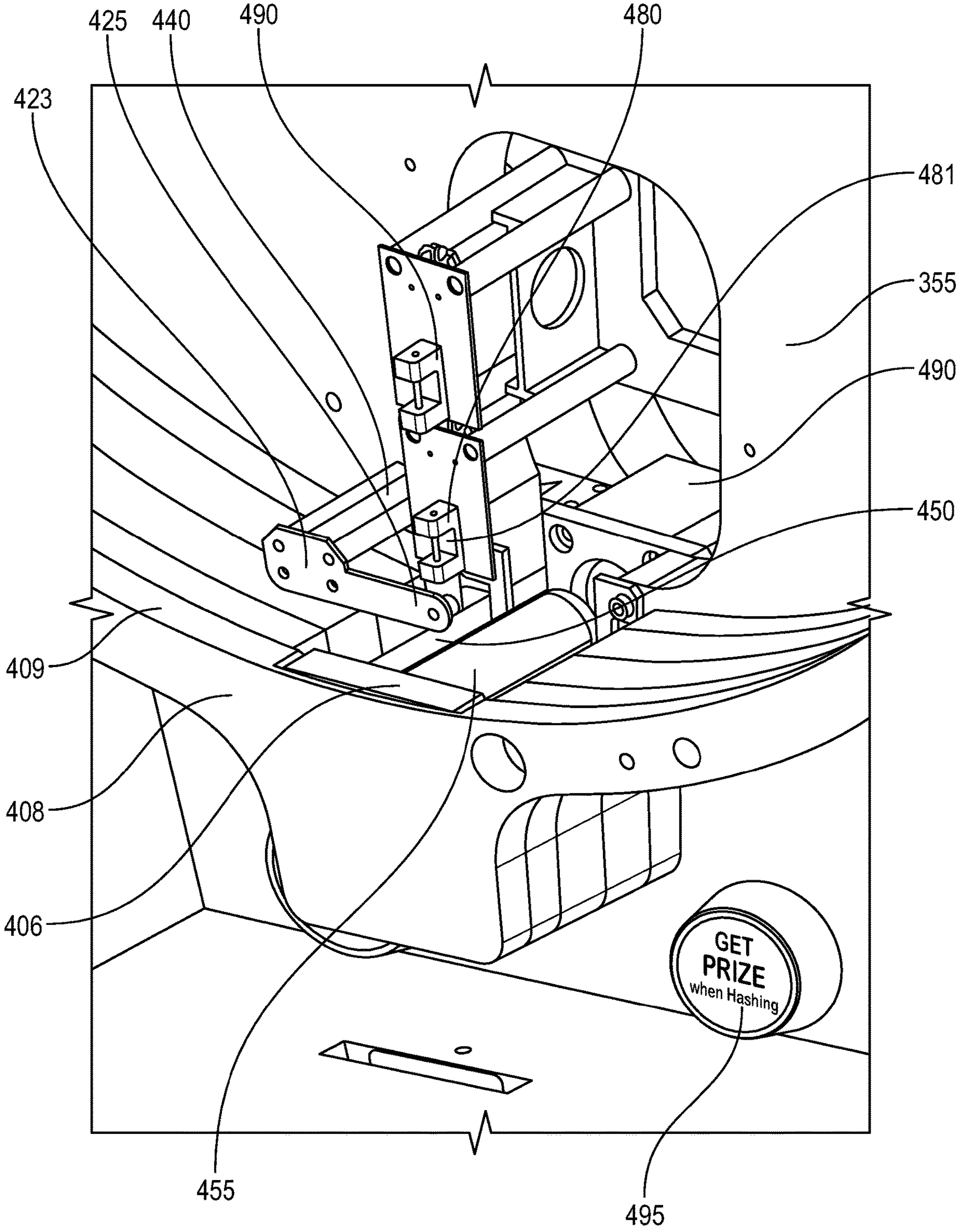
FIG. 4 is a fragmented front view of the card dispending system according to an embodiment of the invention.

FIG. 4 generally depicts wheel detection sensors located behind the prize wheel and a prize card dispenser system. Sensor 480 is an optical sensor that includes an infrared light source, a gap 481, and a light detector. The win position rods travel through the gap as the prize wheel spins, and if the wheel stops at a location when a light curtain passes through gap 481 that is created by the light source of sensor 480 is interrupted for a predetermined time, the corresponding signal from the detector is interrupted for the same time and the central controller will interpret this signal interruption as the prize wheel has come to rest in a winning position. When the winning position has been detected, the central controller sends a signal to the display section 211 to communicate to the player that a winning position has been achieved and provide an auditory signal. In addition, in response to a win, if a card is detected in the cavity, the central controller will initiate the card dispensing sequence.

Sensor 490 is also an optical sensor and has a similar structure and composition as sensor 480. Sensor 490 is positioned to detect the "near miss" rods that extend from the rear surface 505 of prize wheel 185. Like the win position rods, the "so close" rods travel through a gap in the sensor as the wheel rotates, and, if the prize wheel comes to rest in a position that a "near miss" rod blocks the light curtain between the light source and light detector of sensor 490, the signal from the light detector is interpreted by the central controller that the prize wheel is in a "near miss" position. When a "near miss" position is detected, the player is provided game credits. Such credits may be used to provide further spins of the prize wheel, or, in embodiments are transferred to a card having a magnetic strip. In the embodiment depicted in FIG. 3, the diameter of the "so close" rods are larger than diameter of the winning position rods.

FIG. 4 also depicts the prize release and dispensing system that includes motor 490 connected to stop member 406 by an Acme screw 455. The Acme screw, a type of power screw, is engaged by a lead screw, and as shaft rotates as the rotatory motor turns, the threads push the shaft element forward or backward, providing linear motion, depending on the direction of the rotating motion of the motor. Stop member 406 is positioned in alignment with inner surface 409 of annular ring 408, and these two elements block the radial openings of the cavities around the prize wheel.

Figure 12:
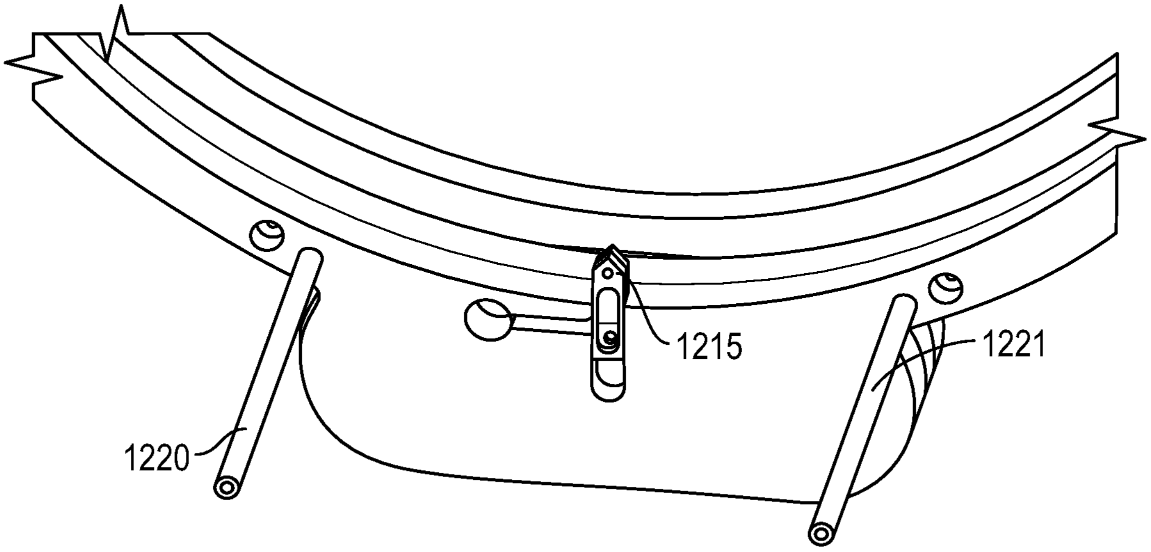
FIG. 12 is a front fragmentary perspective view of the win position of the wheel.

FIG. 4 also depicts gift card sensor assembly, which includes arm 440 that extends perpendicular from read surface 355, lateral arm 423 and sensor detection element 425. This element, a photodetector, is positioned opposite a light source 1215, as seen in FIG. 12, that is located on the opposite side of the prize wheel. Sensor element 425 is designed to detect the presence or the absence of a gift card in a cavity that stops at or near the winning position. If a card is in the cavity, it will block the transmission of light from the light source 1215 and the absence of a signal is interpreted to reflect that a card is present in the prize cavity at the winning position. If no card is detected and the win position rod is detected at a win position, the player is awarded an additional spin or spins, or alternatively a credit.

Figure 6:
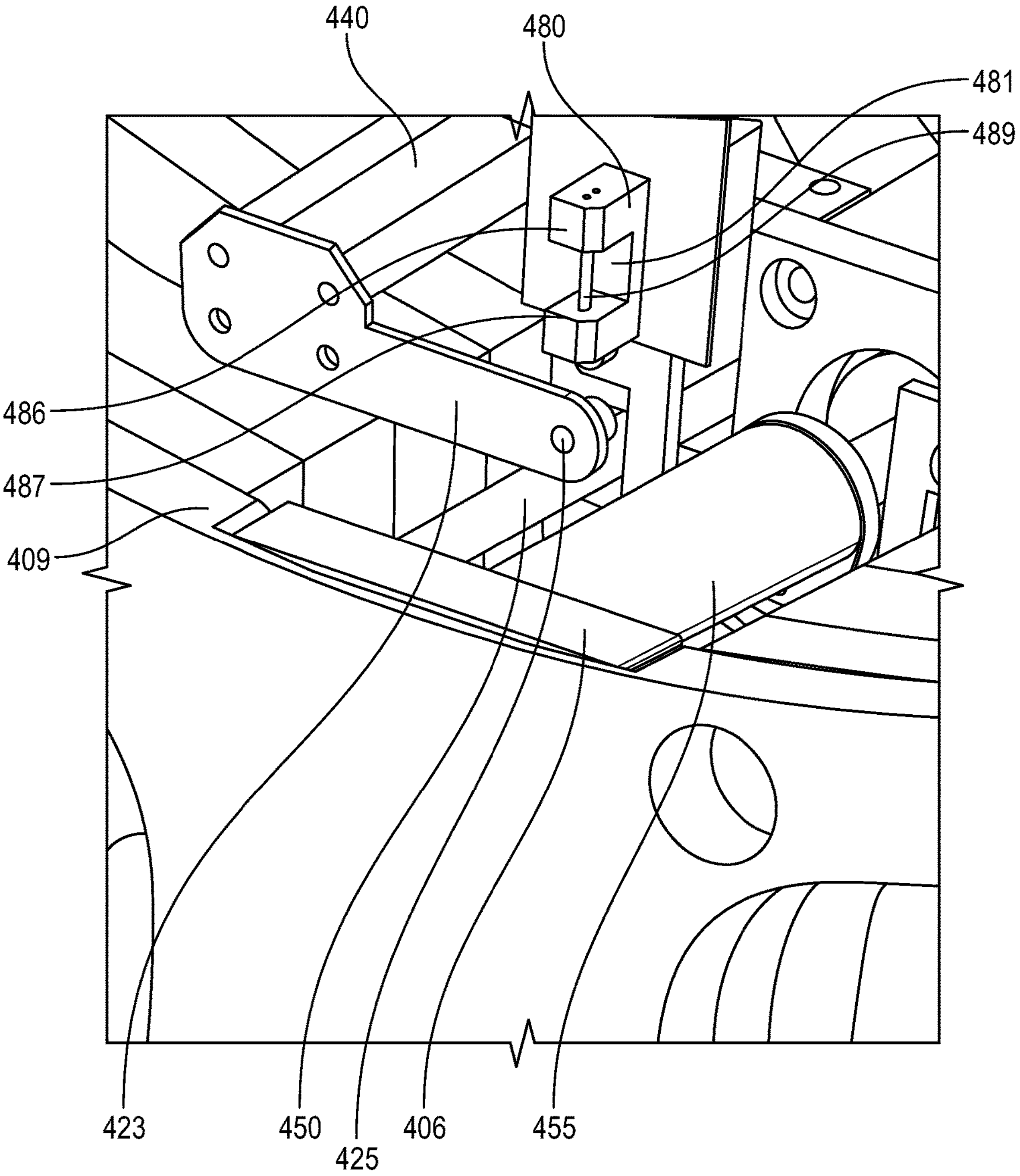
FIG. 6 is a further fragmented front view of the card dispending system elements according to an embodiment of the invention.

If a card is detected in the cavity and the win rod is in a win position, motor 490 is activated and moves the stop member out of alignment with the inner surface 409 of side wall thereby allowing a card to fall though a passage that leads to a dispending area. After a predetermined time as elapsed to allow a card to fall from the cavity, the Acme screw 455 is reversed and the stop member is moved back in a position on to close the cavity. If a card is dispensed, the controller also illuminates the "get prize" signal light 495. FIG. 6 is a close-up view of portions of FIG. 4 and further depict sensor 480 which includes light source 486, light detector 487 and the light beam 489. Rod element 450 is a gauge that tracks the motion of Acme screw 455. After the screw 455 has moved a predetermined, distance, the gauge rod 450 engages a mechanical push button switch to deactivate the motor thereby stopping continued motion of the Acme screw.

Figure 7:
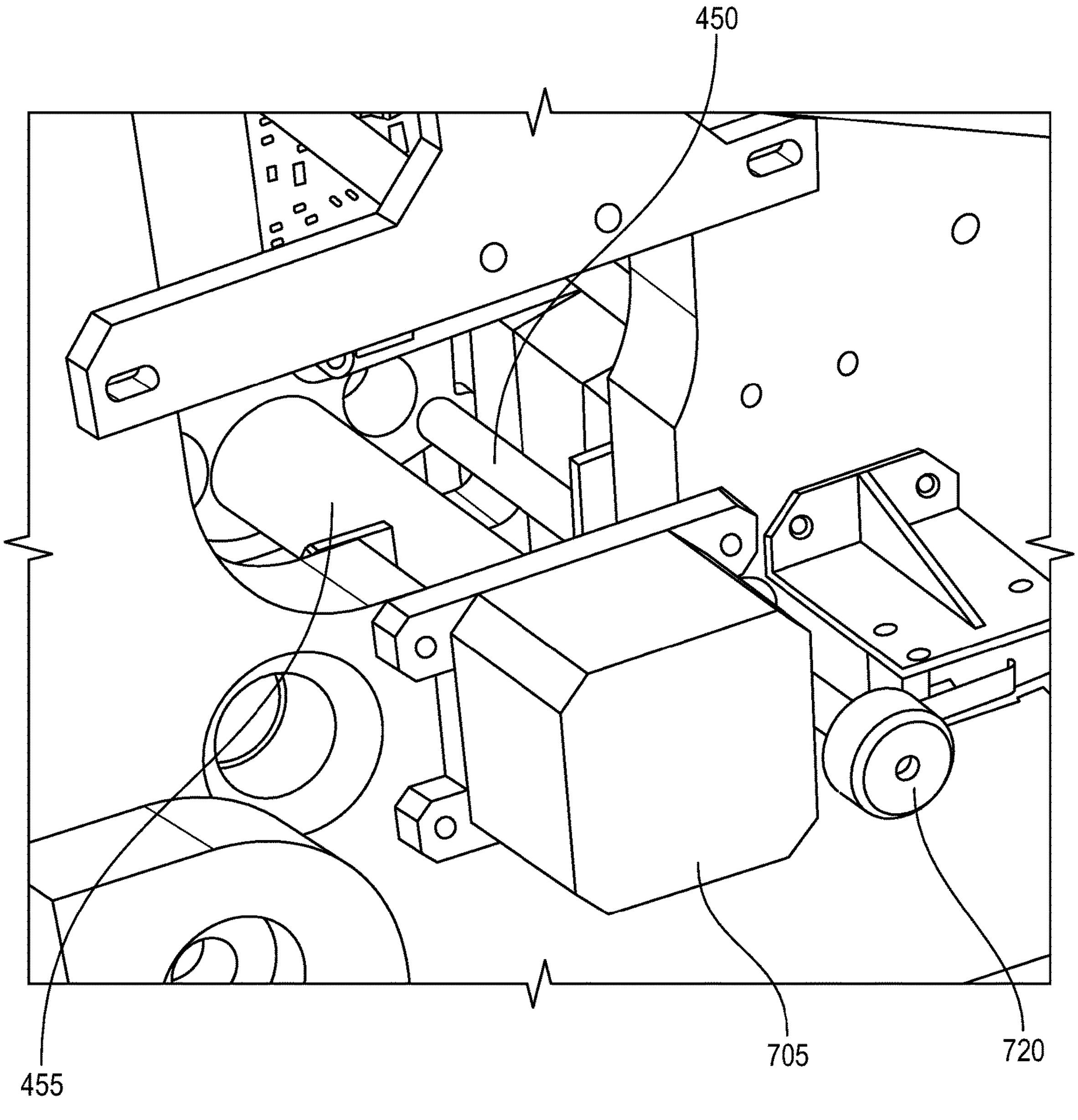
FIG. 7 is fragmented rear view of the card dispending system elements according to an embodiment of the invention.

FIG. 7, a rear view of the card dispenser system, depicts the motor 705, the gauge rod 450 and a gauge adjuster 720 to allow for proper calibration of the distance that the acme screw 455 will travel.

Figure 8:
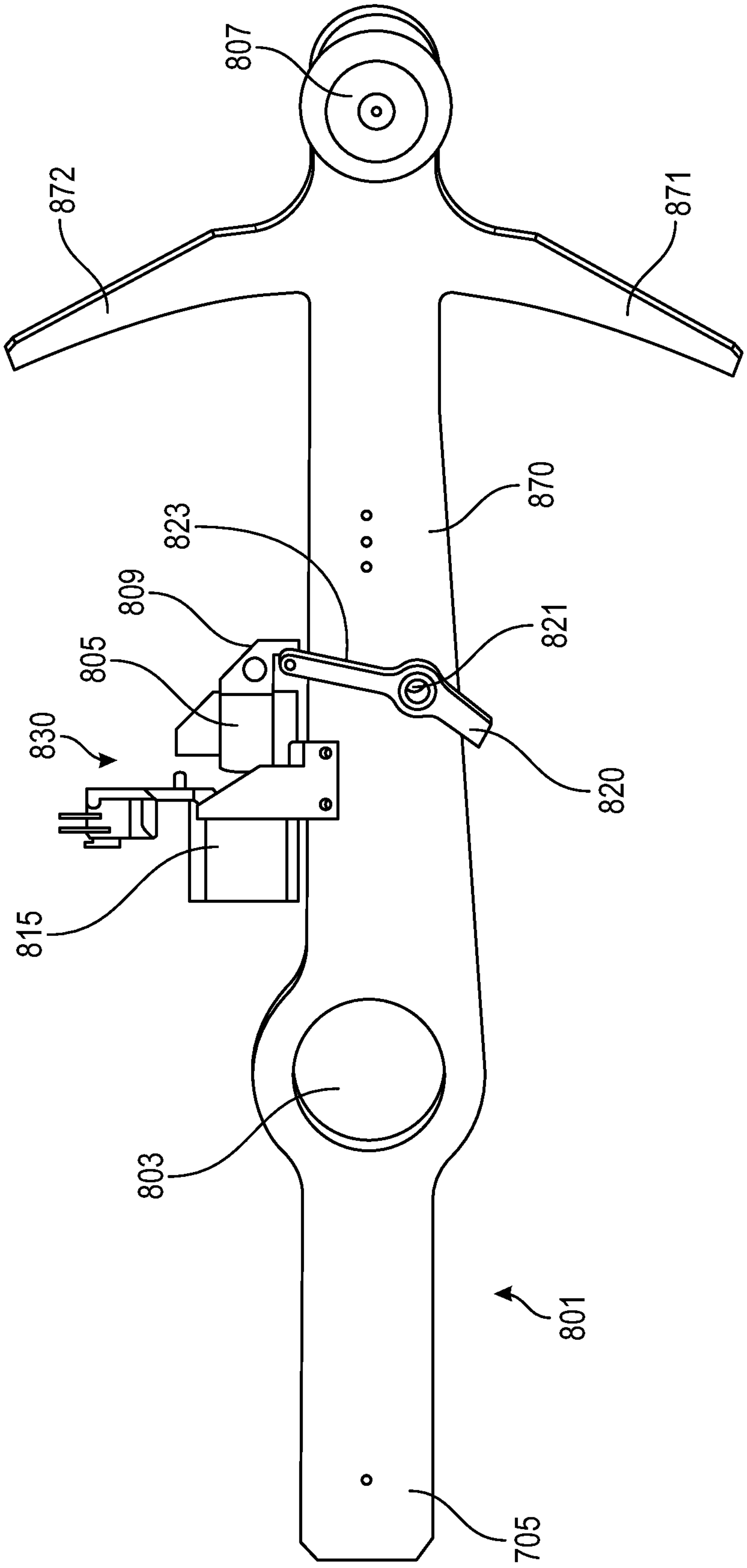
FIG. 8 is a view in elevation of the lever arm assembly according to an embodiment of the invention.

FIG. 8 depicts a lever arm 801 and its associated lever control system 830 that is used to power the prize wheel. One end of the lever arm 801 has flange sections 871 and 872 and handle 807. These flange sections serve to cover the slot opening through which the lever can travel. Lever arm 801 has opening 803 which is attached round the axel of the wheel and serves a pivot location for the arm. The lever control system 830, which allows the engagement and disengagement of the lever to the wheel, is mounted on the top of arm section 870 with bracket 815 includes acme screw 805, arm 809 and pawl 814, which is attached to the side surface of arm section 870 in a manner that allows for pivotal motion at pivot point 821.

Figure 9:
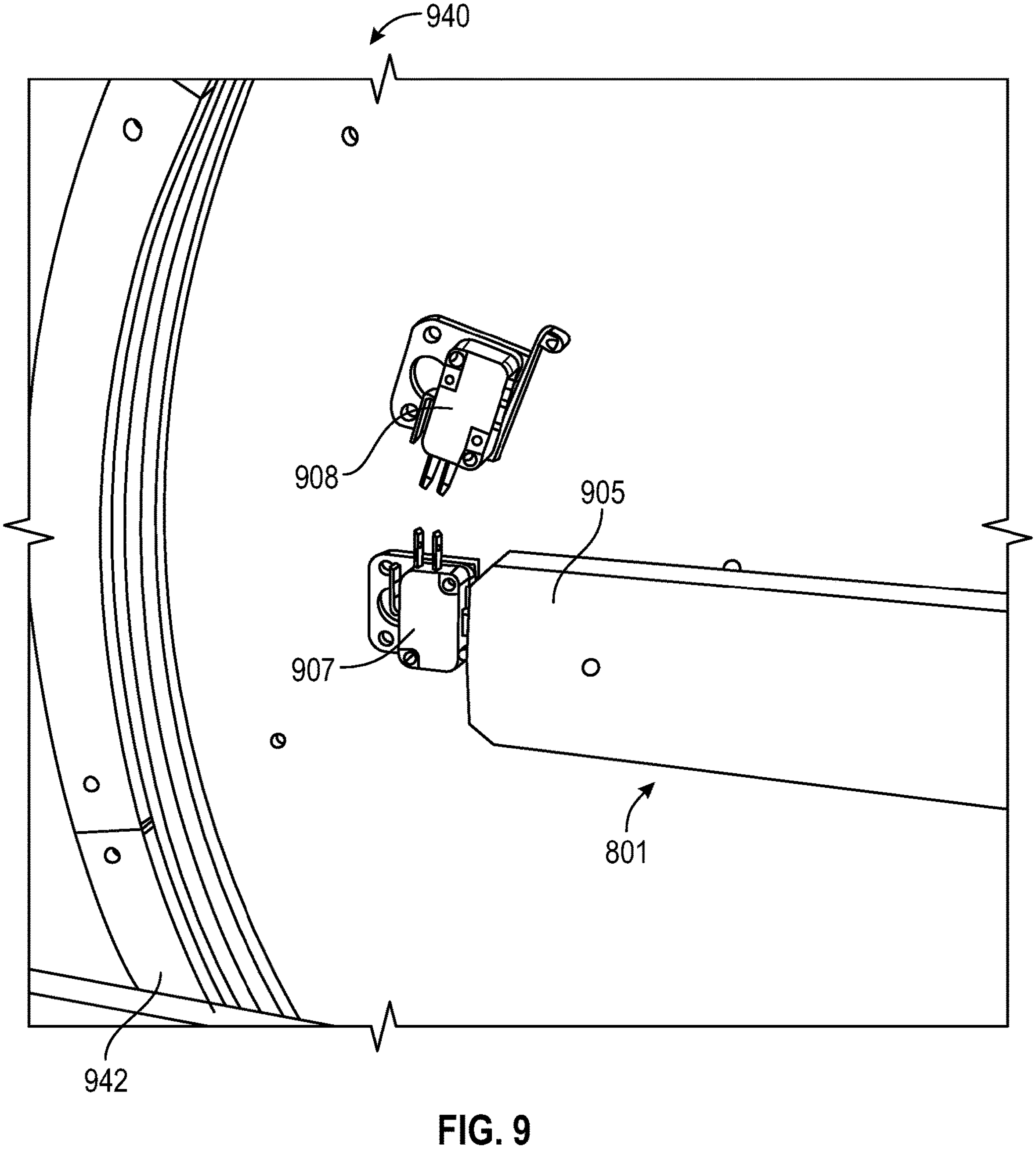
FIG. 9 is a fragmented view of a portion of lever arm depicted in FIG. 8 and associated sensors in position within a wheel structure.

Referring now to FIG. 9, end portion 905 of lever arm 801 will engage arm sensor 907 that detects the arm when in a home position and arm sensor 908 that detects the arm when the arm lever has been activated and the user has pulled the lever downward, causing end 905 to move upwards. These sensors, which are positioned on rear wall 355 of the prize wheel case, provide signals to the CPU reflecting that the lever was pulled down and the wheel has been rotated by a player.

Figure 10:
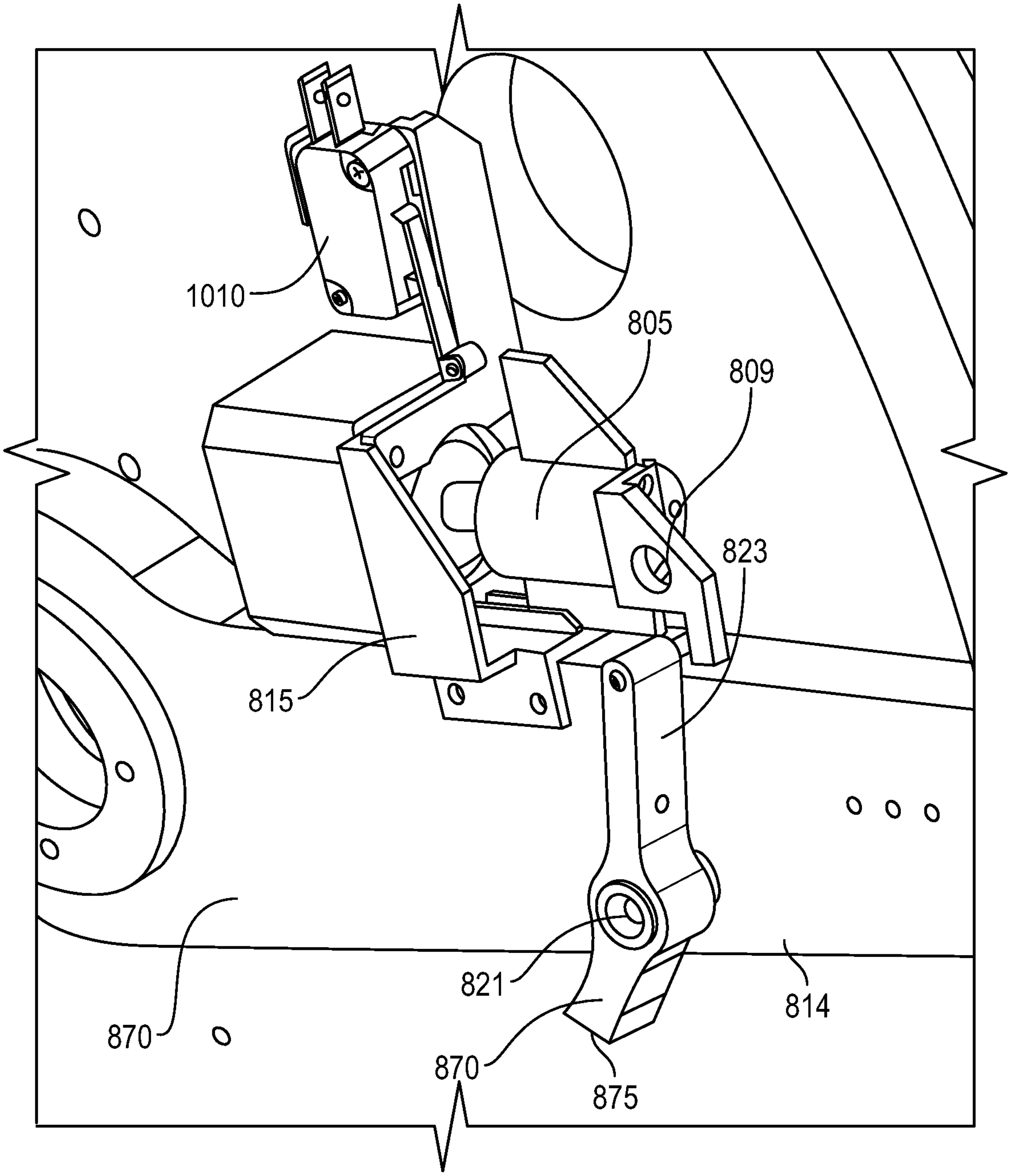
FIG. 10 is a close-up perspective view of the engagement elements of the lever of FIG. 8.
Figure 11:
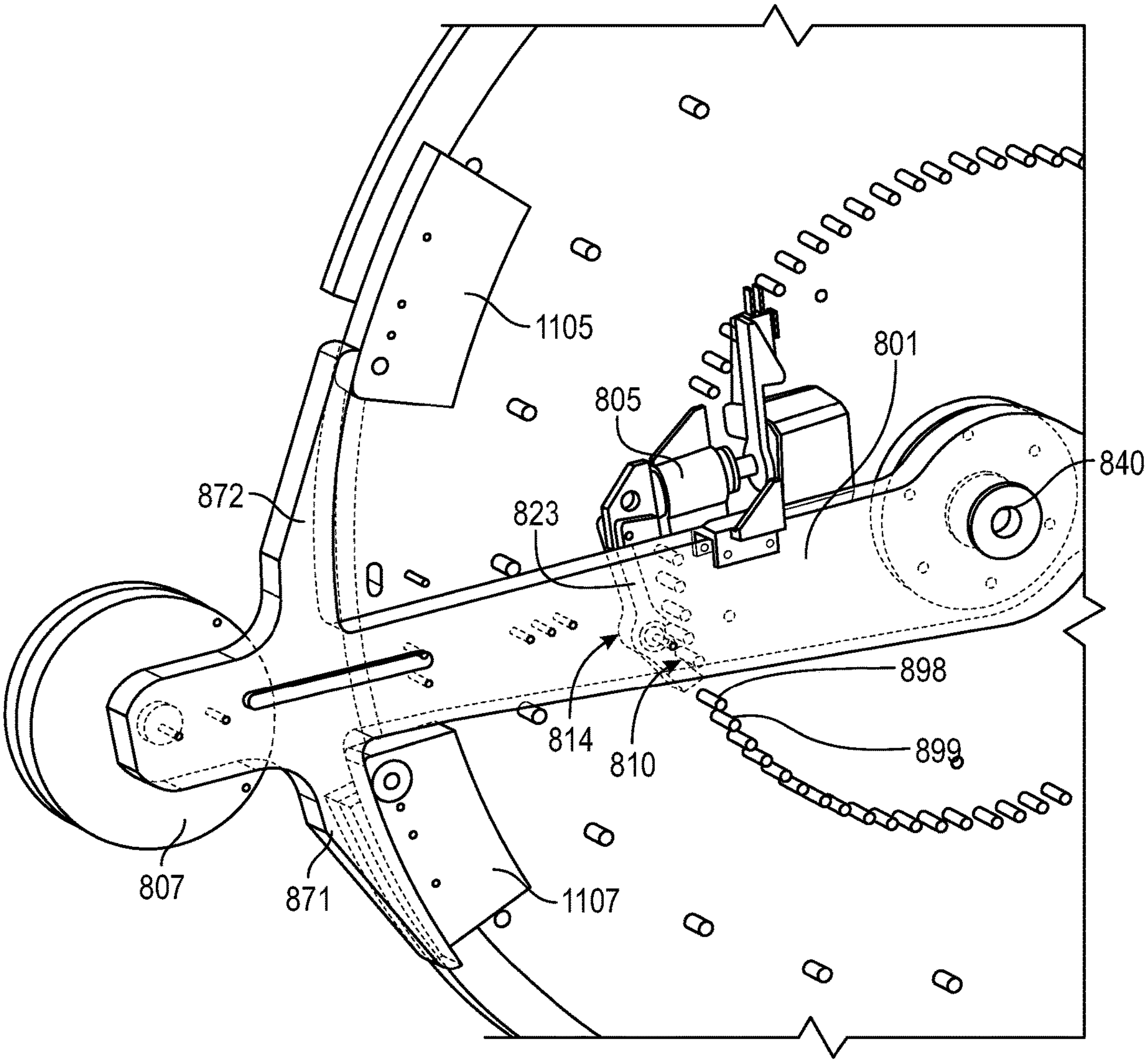
FIG. 11 is a rear fragmentary perspective view of the lever arm and wheel.

As best seen in FIG. 10, the activation of the lever arm is controlled by Acme screw 805 which displaced arm 809 causing section 823 of pawl 814 to pivot about axis 821. This pivotal motion moves section 870 toward the center of the wheel an allows surface 870 to engage rods that make up ring 525 on the prize wheel and that function as a gear in a ratchet mechanism. In alternative embodiments a conventional toothed wheel and pawl may be used. As seen in FIG. 11, the solenoid pivots the bottom surface 870 of the lower arm section 870 of pawl 814 to engage or disengaged drive rods, such as drive rods 898 and 899 in response to signals from a central controller. When the pawl 814 is disengaged from the drive rods that make up ring 525, pulling the lever will have no effect on the prize wheel. Still referring to FIG. 11, fixed stop block member 1105 restricts the travel of lever arm 810 in one direction and stop block member 1107 restricts the travel of the lever arm 810 in the opposite direction.

While the specific embodiment depicts a control arm lever that extends in a plane parallel with the wheel, in other contemplated embodiments an arm is provided that extends in a plane that is perpendicular to the plane defined by the wheel by using, for example, a bevel gear arrangement.

As referred to above, FIG. 12 depicts an indicator element 1215 at the wining position on a lower side of the prize wheel case that the winning position The device also includes a prize detector 425 comprising a light source that projects a light beam at the prize location. If a prize is in the cavity, it will block the passage of light to a photodetector located on the rear side of the container. In embodiments, a reflector on the opposite surface of the cavity that reflects light back to a sensor opposite the cavity. If there is no prize in the cavity, light is reflected off the opposite surface and will impinge on a sensor located next to the light source. If a player spins the wheel and it comes to rest at a winning position but there is no prize in the cavity or container associated with the wining position, the player is awarded credits for a predetermined number of additional spins.

Mounting rods 1220 and 1221 attach display 190 to the prize wheel case at the top of the device.

Figure 13:
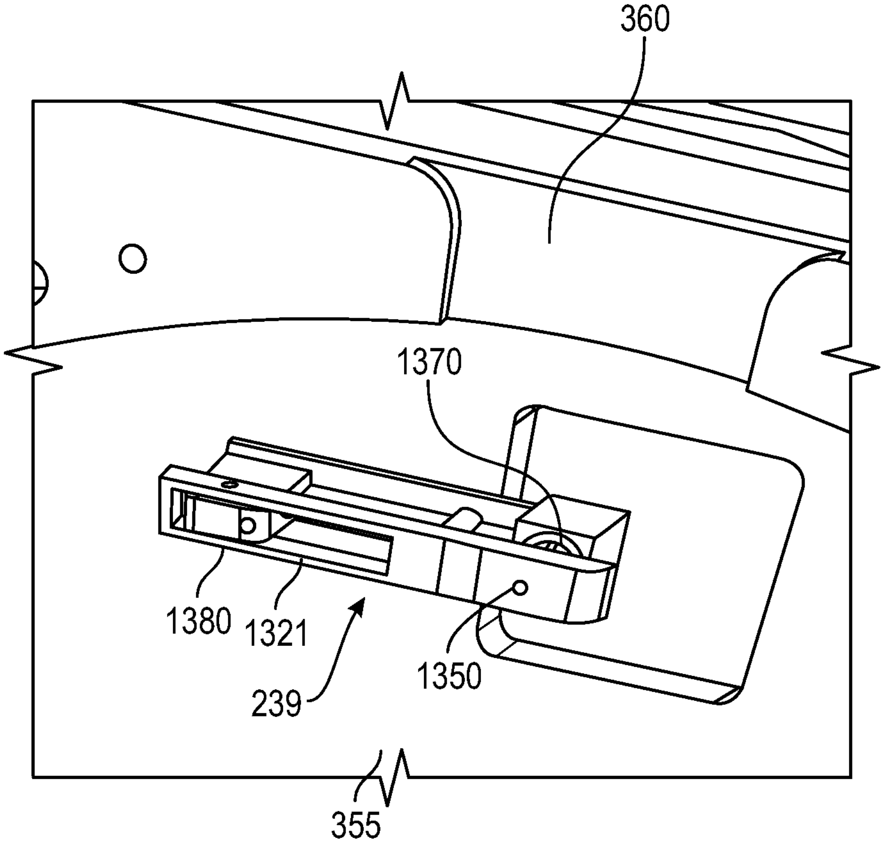
FIG. 13 is a front perspective view of the wheel brake and card load slot.

FIG. 13 depicts the brake member 239 attached to the rear wall 355 of the prize wheel case 105 which includes engagement surface 1350 that is biased against the rear surface of prize wheel 185 by compression spring 1370. Engagement surface 1350 is at the end of arm 1321 that is mounted for pivotal attachment about axis 1380. Display 111 can be pivoted from its vertical position to allow access to the prize load slot 360, through which new prizes or cards may be loaded into the prize wheel cavities. When all the prize cavities are filled, the display 111 is placed back in vertical position and secured.

Figure 14:
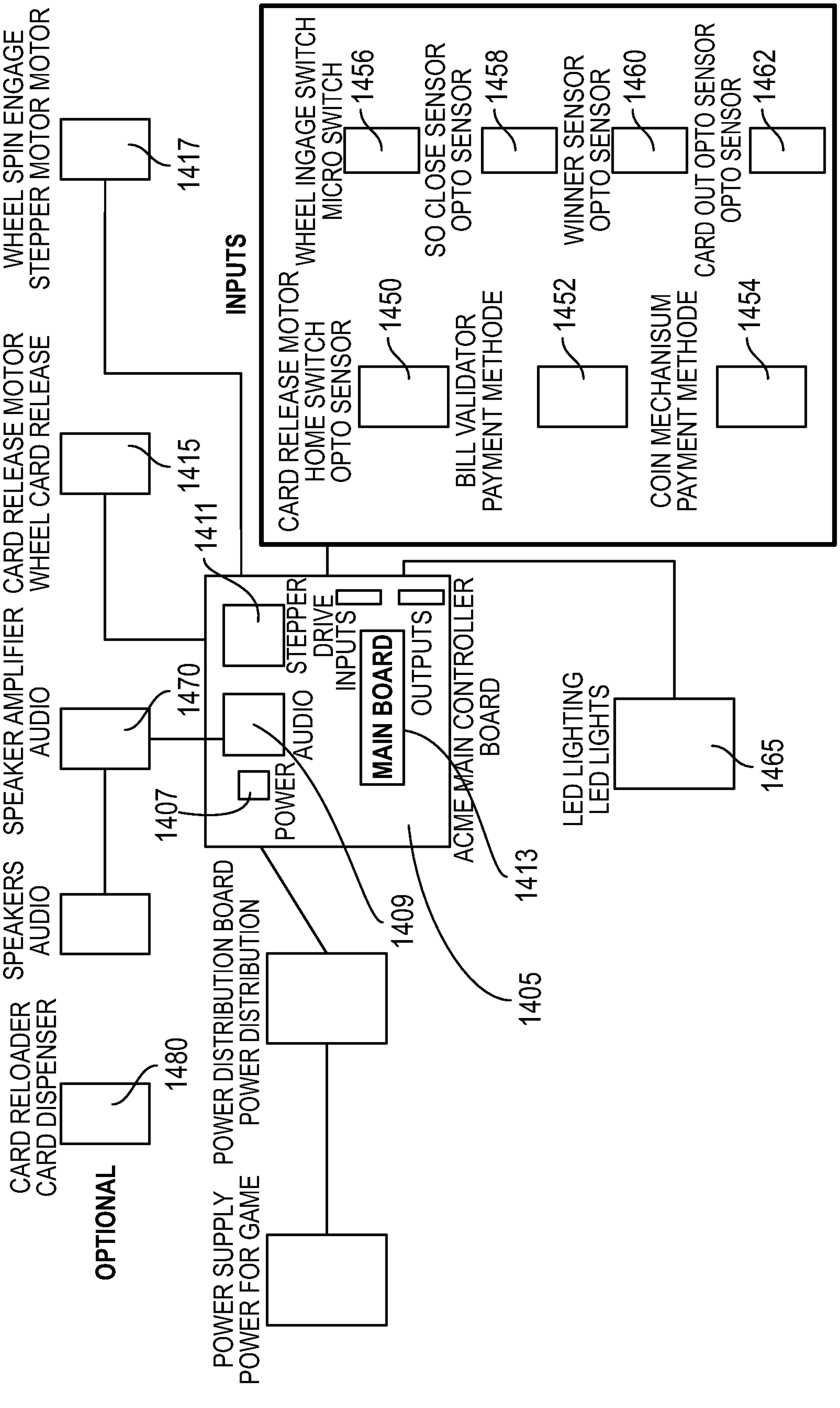
FIG. 14 is a schematic plan view of the electronic elements of the invention.

FIG. 14 depicts a main board 1405 on which includes a power supply 1407, an audio module 1409, a stepper motor drive module 1411 and central controller 1413. Stepper motor module 1411 controls card release motor 1415 and wheel spin lever engage motor 1417. Main board 1405 receives input signals from the card release home switch optical sensor 1450, the bill or payment validator device 1452, a coin mechanism payment device 1454, a wheel engaged micro switch 1456, a first "so close" wheel position sensor 1458, the "winner" wheel position sensor 1460, and a card out optical sensor 1462. Outputs from the main controller include lights 1465 and sound effects 1466. In embodiment, the system also includes a card reloader and card dispenser device 1470.

Figure 15:
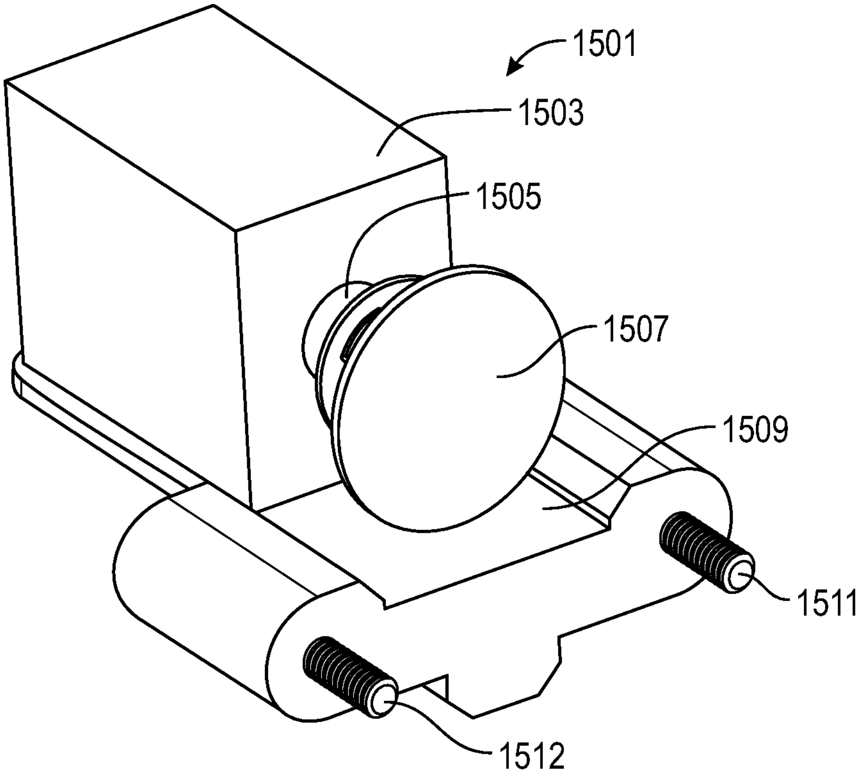
FIG. 15 is a perspective view of a solenoid device that is used in an alternative embodiment of the invention.
Figure 16:
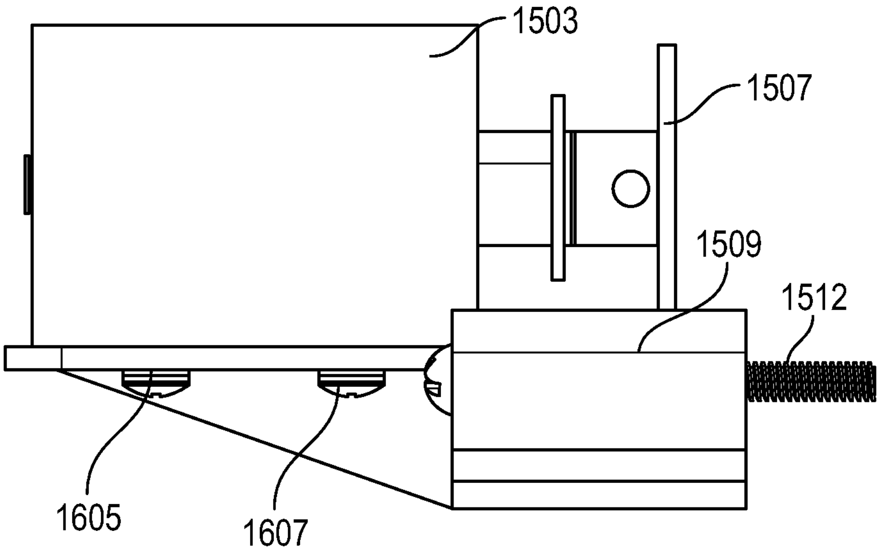
FIG. 16 is a side view of the solenoid of FIG. 15.
Figure 17:
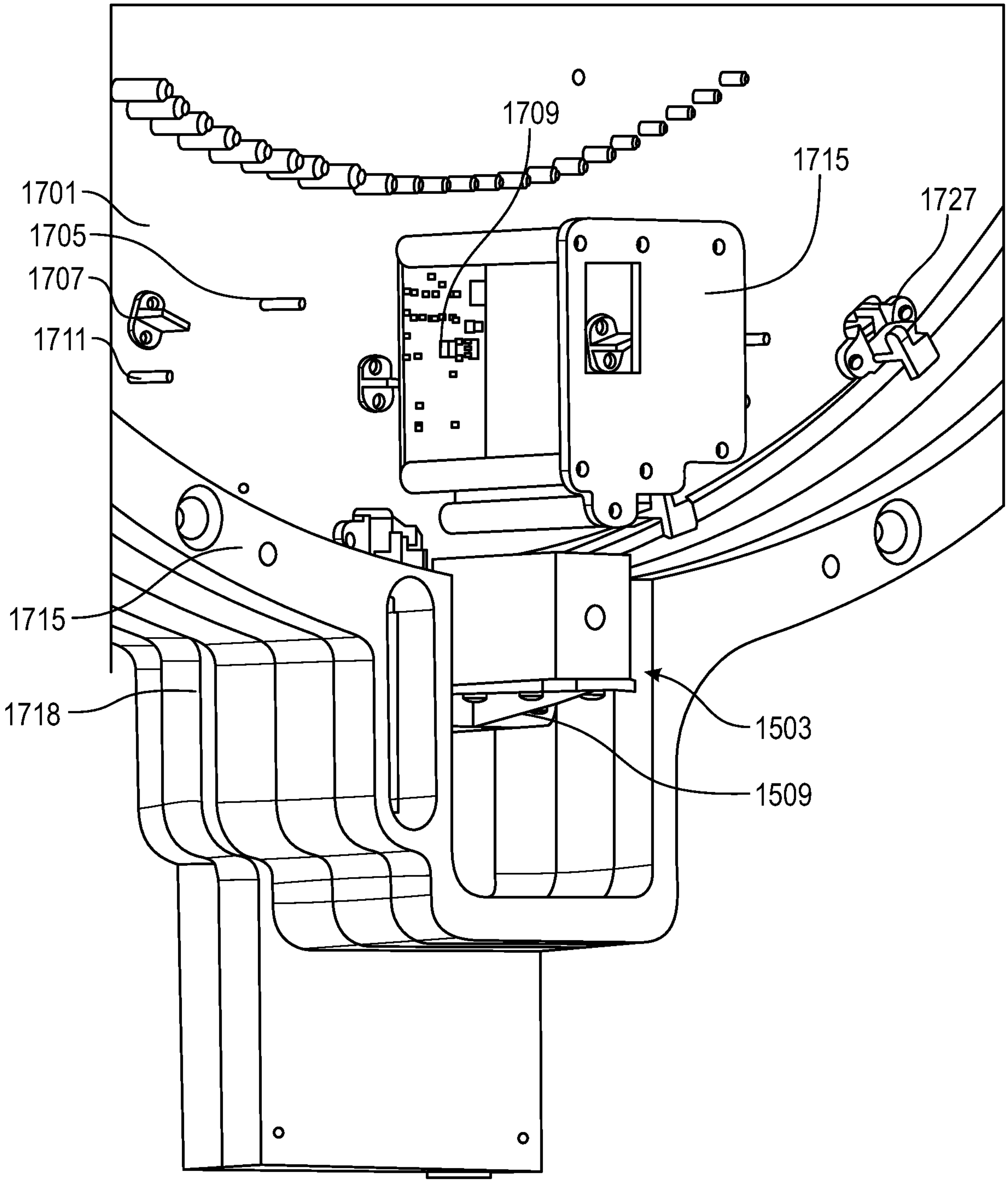
FIG. 17 is a perspective view of the rear of the wheel assembly depicting of the location of the solenoid and wheel position detector.

Now referring to FIG. 15, in an alternative embodiment the prize dispensing portion of the device uses a solenoid assembly 1501 that is controlled by the central controller. The solenoid assembly includes a core portion 1503 that contains a winding, a piston 1505 and a contact member 1507. The solenoid assembly 1501 is attached to bracket 1505 which is in turn attached to a spacer ring on the rear of the wheel assembly. As shown in FIG. 16 the solenoid assembly 1503 is attached to the bracket 1509 by fasteners 1605 and 1607. When the solenoid is activated, piston 1505 will retract into core portion 1503 causing the engagement member 1507 to engage a prize retainer assembly.

Solenoid assembly 1503 is attached to support ring 1718 on the rear side of the game device by bracket 1509. Extending from rear surface 1701 the wheel is position pin 1705, position fin 1707 and position pin 1711 each of which extend perpendicularly to the plane defined by rear surface 1701 of the wheel. Also shown is wheel position detector 1709 and detector bracket 1709 which is mounted on the rear circular casing of the game device that encloses the wheel. A prize retainer assembly 1727 is also depicted along the peripheral edge 1702 of rear surface 1701.

Figure 18:
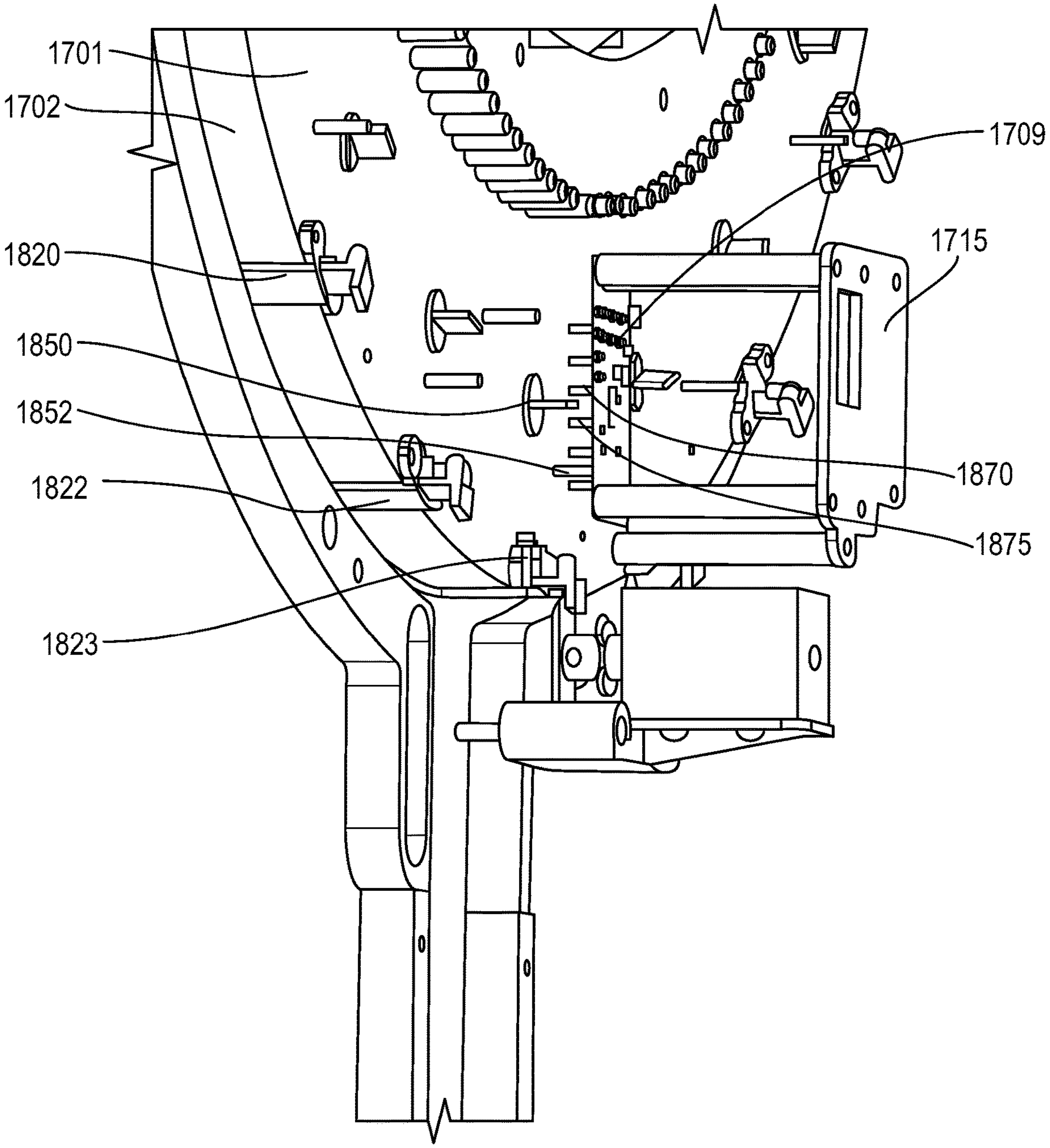
FIG. 18 is another perspective view of the rear surface of the wheel assembly showing the stop member and stop member sleeve and elements used to detect the wheel position.

Referring now to FIG. 18, a number of prize retainer assemblies 1820, 1822, and 1823 are shown along the peripheral edge of the wheel. Each of these prize retainer assemblies are associated with a prize cavity visible on the front side of the wheel and which are configured to retain a prize therein such as a gift card. As the wheel rotates, win position pin 1852 and extension fin 1850 pass by detector 1709 and interrupt a light curtain. For example, a light curtain is defined by fin 1850 includes light source 1870 and photodetector 1875, as a fin 1850 passes through the light curtain, the fin will interrupt the light curtain and a signal is sent to a central processing unit.

If the wheel comes to rest at a position when win position pin 1852 stops at the location between a light source and light detectors, reflecting a win or near miss, the CPU detects this signal (or an absence of a signal) and then transmits an outbound signal to activate the solenoid and thereby engage the prize retainer assembly that is associated with the winning location. The CPU may also send signals to a light display and audio speaker system to signal to the user that a win was detected.

The game also has a "near miss" feature wherein, if position fin 1850, which has a larger circumferential dimension than win pin 1852, passes through the detector and comes to rest at a location where it interrupts a second light curtain created by light source 1870 and light detector 875, a signal is transmitted to the central processing unit reflecting a "near miss." The central proceeding unit then determined if a win has been detected by the win pin detector. If a win has been detected, the CPU disregards the signal. If no win has been detected, the Central processing unit sends a signal to activate the credit switch to reward the player with another spin of the wheel. In embodiments, the CPU will also provide a signal to a light display that is illuminated to inform the player of the existence of an additional credit.

Figure 19:
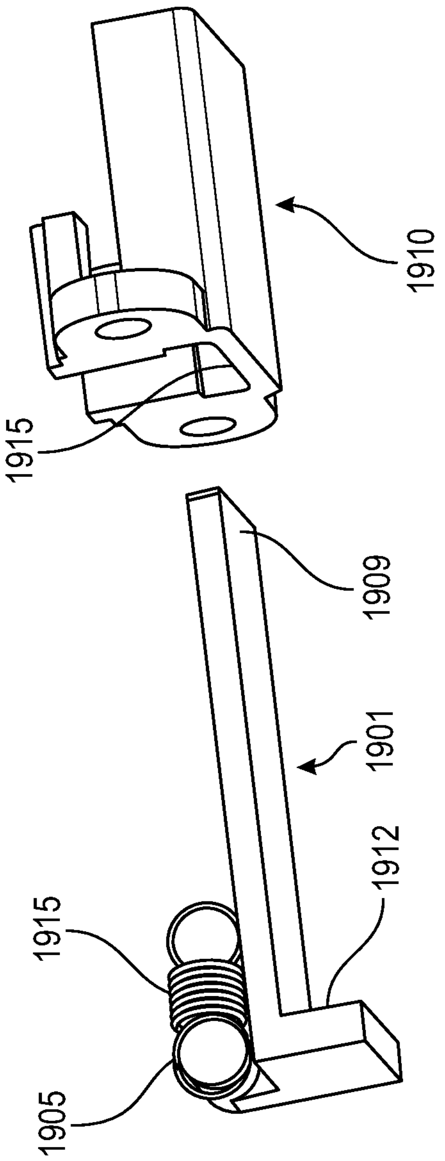
FIG. 19 is a perspective view of the front of the wheel assembly including prize retainer elements.

When a win has been detected, in embodiments, the CPU looks up the signals from the prize detection sensor, and if a prize is present in the cavity, solenoid 1501 is activated causing piston 1505 to retract into coil section 1503, wherein the engagement member 1507 on the distal end of the piston 1505 moves rearward with respect to the wheel, pulling the stop member from the passage. As best seen in FIG. 19, the retainer assembly includes a stop member 1901 and bracket 1910 which includes groove 1915 which receives stop member 1901 and allows for it to slide therein. The stop member is biased in a blocked position across the passage by spring 1915 which is attached to peg 1905 and an attachment point on the wheel causing the distal end of member 1909 to extend into the passage located at the end of the cavity or container. When force is imposed on surface 1912, stop member slides rearward within bracket 1910, drawing the distal end 190 out of the passage, thereby allow any item in the cavity to drop into prize access area. When the retainer end 1909 of stop member 1901 is removed from the passage, any prize contained in the cavity will fall out of the cavity and is directed to a prize access area.

Figure 20:
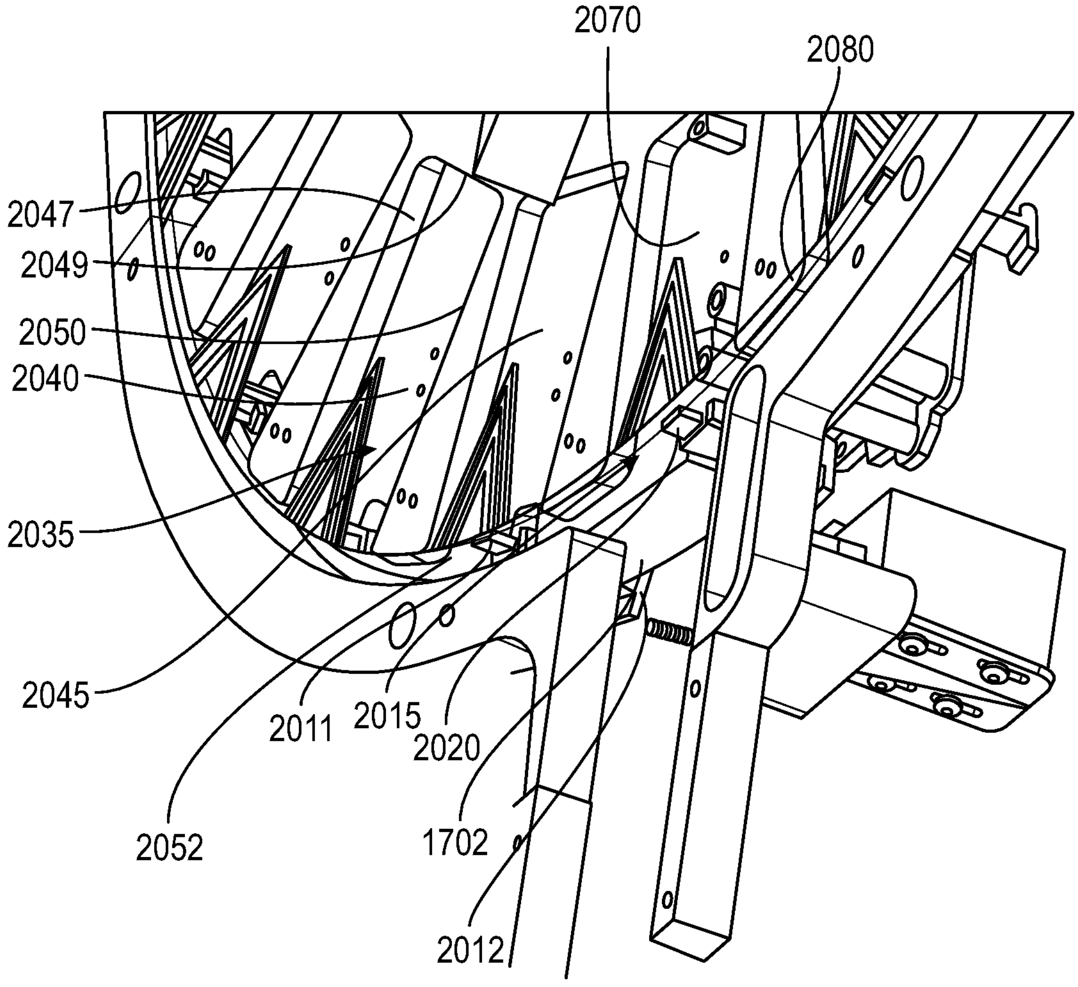
FIG. 20 is a close-up perspective view of the rear of the wheel and prize retainer elements.
Figure 21:
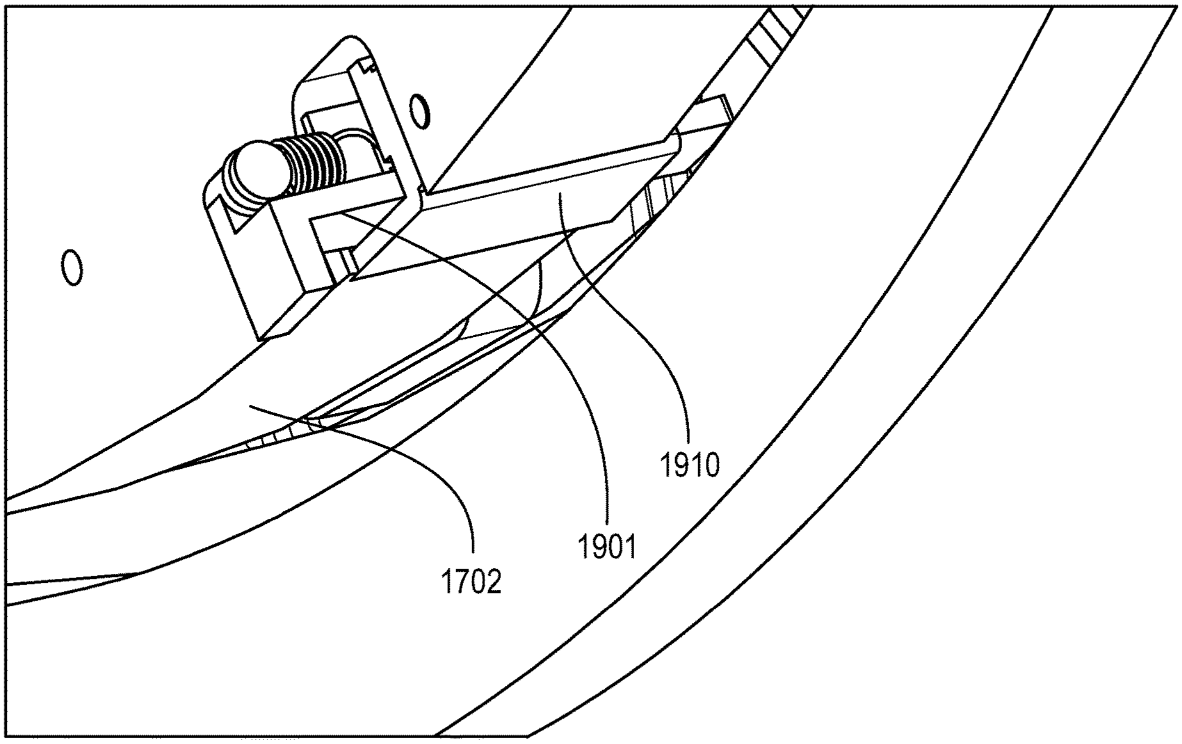
FIG. 21 is an exploded view of the prize retainer element including the stop member and sleeve.

The relationship of the prize cavities or containers and the stop members is shown in FIG. 20. For example, cavity 2035 is defined by wheel surface 2040, sidewall 2047, end wall 2049 and sidewall 2050. The region opposite end wall 2049 is open and provides for a passage into the prize container to allow it to receive and dispense items. The top planar surface of the cavities or containers are enclosed by a transparent planar member 280. Also shown are cavities 2045 and 2070 which are provided on the front surface of the wheel. Cavity 2045 has passage 2052 at one end and cavity 2070 has passage 2015 on its end opposite the axis of the wheel. Items received in the cavity are prevented from moving though passage 2052 by stop member 2011 and items contained in cavity 2070 are retained in the cavity by stop member 2020. The opposite end 2012 of stop member 2011 extends past the rear side of the wheel where it can be engaged by the solenoid to moves the stop member to open the container.

While the containers or cavities for prizes in the depicted embodiment are on the front surface of the wheel, in embodiments the cavities or containers may be provide within the wheel itself and the passages into the container or cavities are provided through the circumferential sidewall of the wheel.

In the embodiment depicted, the dimensions of the cavities are rectangular and will accommodate a standard credit card size, referred to as an ID-1 by the International Organization for Standardization, and which has the following dimensions: width of 3.37 inches (85.6 mm), height of 2.125

(53.98 mm), thickness of 0.03 inches or 0.76 millimeters. The thickness, approximately 30 mil provides a durable product. The weight of a plastic credit card is around 5 grams and metal cards may weigh 15 grams or more, and some weighing up to 27 grams.

In embodiments that dispense collectable cards, different sized cavities may be provided. For example, baseball cards in 2021 measure approximately 2½ inches by 3½ inches. As such, a different size cavity and loading slot are provided for these prizes. The size of sports collectable cards will vary but the most common size thickness is 20 pt. Sports card thicknesses are almost universally measured in 'points' or 'pt' for short. 1 point is the equivalent to 0.001 inches or 0.025 millimeters. There is a large variety of different sizes which are commonly 55 pt, 75 pt, 100 pt, 120 pt, 130 pt, 180 pt and 360 pt. For such embodiments the dimension of the cavity may have a length of 2.⅝ inches a width of 3⅝ inches. The thickness of the cavity will depend on the thickness of the card and the number of cards in a pack that may be dispensed.

Figure 22:
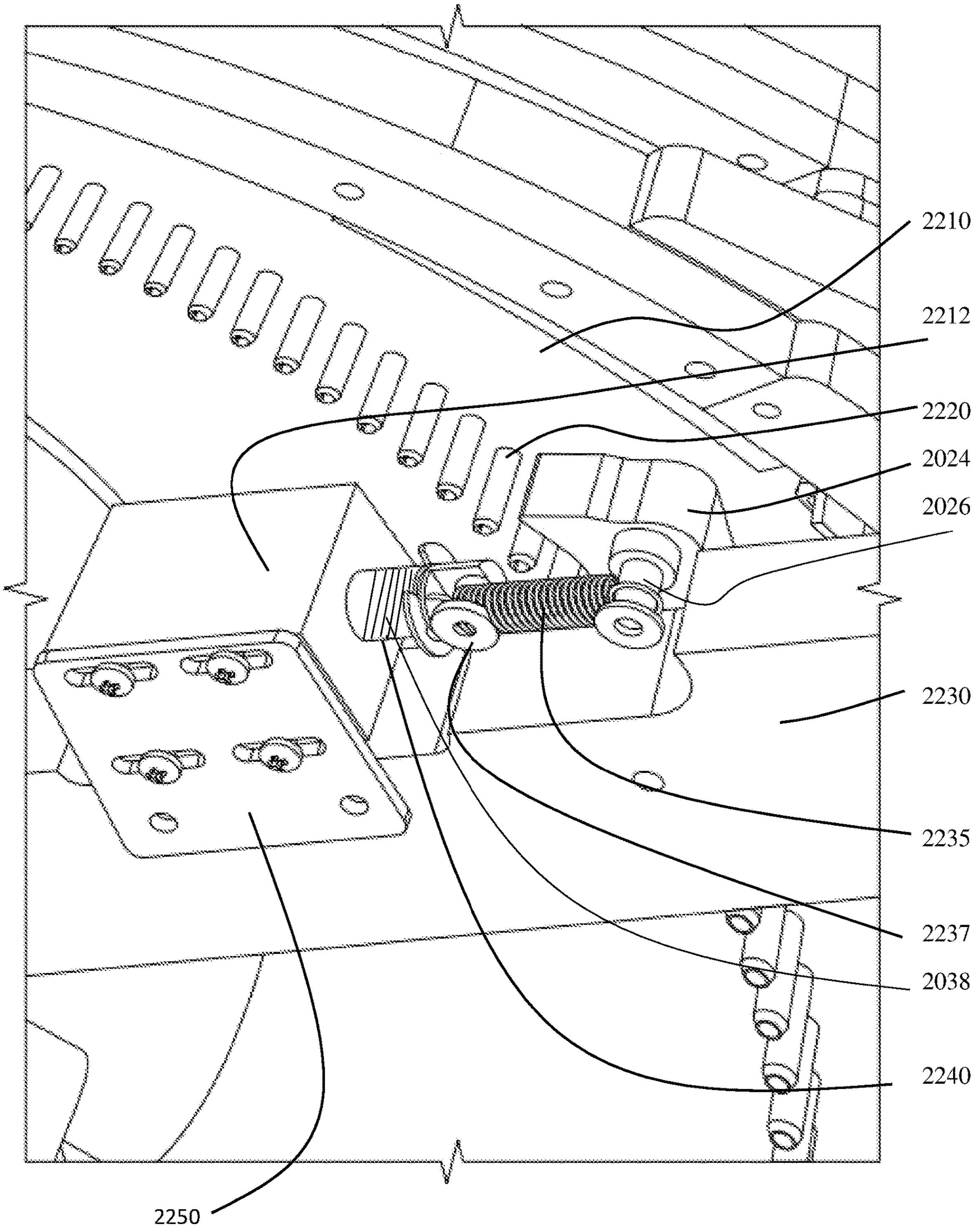
FIG. 22 is a perspective view of arm assembly and wheel that uses a solenoid to engage the rods extending from the wheel.

Now referring to FIG. 22, an alternative lever control system 830, to affect engagement and disengagement of the lever to the wheel, is mounted to the lever arm 2230 with bracket 2250 and includes solenoid magnet core 2212, solenoid post 2240 and pawl 2024, which is attached to the side surface of arm 2230 in a manner that allows for pivotal motion at its point of attachment. When a credit button switch is activated, solenoid post 2240, which is biased out of core 2212 by compression spring 2038, retracts into the core 2212 and pulls the spring 2235 towed the core thereby pulling paw 2024 into an engagement position with the drive rods, such as 2202. A plurality of drive rods extend from the rear wall of the wheel in an annular arrangement and, together, function as a gear. After a spin of the wheel, the solenoid is deactivated and the spring 2238 pushes the pawl 2024 away from the drive rods.

While the embodiments discussed above are directed to cards, other items may be provided in the cavities or containers such as jewelry, cigarettes, earbuds, software, thumb drives. trinkets, toys, tickets, and plush.

The foregoing description of the present invention has been presented for purposes of illustration and description but is not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

I claim:

1. An amusement game device comprising a wheel, said wheel mounted for rotation on an axis and in a vertical plane on a support member, said wheel having a front surface, a rear surface and a circumferential surface and having a plurality of winning positions located at angular positions around said wheel, said wheel having a plurality of containers also associated with said winning positions on said wheel, and each said container having passages in a radial direction from said container, a dispensing assembly, said dispensing assembly comprising a dispensing actuator connected to a retainer member and said dispensing actuator configured to displace said retainer member and thereby open said passage, a wheel drive assembly comprising, an arm, a pawl attached to said arm in a manner to allows for pivotal movement, and a device to effect engagement and disengagement of said pawl with said drive elements on said wheel, wherein when said pawl is engaged with said drive element on said wheel, movement of said arm can impose a force on said pawl and said force is transferred to said wheel drive elements to cause said wheel drive elements to cause said wheel to rotate, a winning position detector for detecting the position of said winning positions on said wheels with respect to a fixed position on said support member, wherein said winning position is a location when a container comes to rest at a location when it is directly centered at the bottom of the wheel, and a controller, that in response to a signal from said winning position detector, is configured to activate a motor in said dispensing assembly to cause said retainer member to open a passage and thereby release any item in said container in a vertical direction.

2. The device recited in claim 1 wherein said dispensing actuator comprises an Acme screw.

3. The device as received in claim 1 wherein said dispensing actuator comprises a solenoid.

4. The device as recited in claim 1 wherein said drive elements comprise a plurality of rods that that extend from said wheel and form an annular ring.

5. The device as recited in claim 1 wherein said wheel is enclosed in a case that has a front transparent window, a rear panel and a side wall that surrounds the circumferential side of said wheel, and said side wall comprises an opening at the bottom in alignment with said winning position and which, when aligned with a container on said wheel, provides a passage from said container to a prize distribution area, and a top opening that provides a passage to said containers and a lateral opening through which said arm extends.

6. The device recited in claim 5 further comprising a container item detector that is positioned to detect the presence of an item in a container that comes to a stop at said winning position wherein said item detector is in communication with said controller, and said controller is configured to provides an output credit in the event the wheel stops at said winning position and the associated container lacks an item in said container.

7. The device as recited in claim 1 wherein each said retainer member is a part of a retainer assembly, and said device comprises a plurality of retainer assemblies, each associated with each said container and each said retainer assembly further comprises a bracket member that is attached to said wheel and a spring, wherein said spring biases said retainer member in a closed position, and said bracket member retains said retainer member and said actuator is attached to said retainer member to allow it to impose a force on said retainer member to move said member out of said passage thereby opening said passage.

8. The device as recited in claim 1 wherein said device to allow engagement and disengagement of said drive elements by said pawl comprises an arm engagement actuator attached to said arm, and which is controlled by said controller.

9. The device as recited in claim 8 wherein said arm engagement actuator comprises an Acme screw.

10. The device as recited in claim 8 wherein said arm engagement motor comprises a solenoid.

11. The device recited in claim 8 further comprising a credit detection device which sends a signal to said controller when a credit has been detected, and said controller then activates a switch that a user can control to activate said arm engagement actuator to cause said pawl to engage said drive elements.

12. An amusement machine comprising a wheel mounted for rotation in a substantially vertical plane on a support member, said wheel comprising a front surface, a rear surface and a circumferential surface, a plurality of prize containers located at angular positions on said wheel, a winning position location at a fixed position at the bottom of said wheel, a winning position detector to detect wheel position when wheel comes to stop at said winning position, a drive arm and drive arm engagement actuator, said drive arm engagement actuator configured to cause said arm to engage said wheel in response to a signal from a central controller and allow said arm to impose a force on said wheel to rotate said wheel, a prize retainer member and prize release actuator, said prize release actuator configured to move said prize retainer member in response to a signal from said controller to open a passage from a container at said winning position to a prize accessible area, and allow an item in said container at said winning position to drop to said prize accessible area, and a credit detector in communication with said central controller, wherein in response to the detection of a credit, said central controller activates said drive arm engagement actuator to engage said drive arm to said wheel.

13. The device recited in claim 1 wherein said winning position detector comprises a fixed light source that creates a light beam that is directed towards a fixed photodetector and said detector is positioned to detect a winning position pin that is attached to said wheel at an angular position which corresponds to a position where one of said containers stops and is aligned with said winning position at the bottom of the wheel and said pin interrupts said light beam for a predetermined time.

14. The device as recited in claim 1 further comprising a wheel rotation distance detector, said detector comprising pins that extend perpendicularly from said wheel and a photodetector that detects said pins; wherein said photodetector to send signals to a controller that is configured to analyses said signals to determine the rotational distance the wheel travels after a force has been imposed by said wheel drive assembly.

15. The device recited in claim 1 further comprising a near miss detector, said near miss detector comprising a member perpendicularly extending from said wheel in a position that is detected by a photodetector and provides a signal to said controller when said wheel is at an angular position that is larger than the angular position that has been designated as the winning position and therefore said near miss detector can detect a wheel position that includes both wins and near misses.

16. The device as recited in claim 1 wherein said containers are sized to receive and dispense a card having the size of standard credit cards.

17. The device as recited in claim 5 wherein said top opening further comprises a loading passage, said loading passage comprising a slot opening through said case and radially extending to a passage associated with said container, wherein prize items can be inserted through said slot into containers that are empty.

* * * * *